(12) United States Patent
Lin

(10) Patent No.: US 8,451,624 B2
(45) Date of Patent: May 28, 2013

(54) PORTABLE ELECTRONIC DEVICE

(75) Inventor: Yu-Yuan Lin, Taipei (TW)

(73) Assignee: Compal Electronics, Inc., Taipei (TW)

( * ) Notice: Subject to any disclaimer, the term of this patent is extended or adjusted under 35 U.S.C. 154(b) by 331 days.

(21) Appl. No.: 13/006,435

(22) Filed: Jan. 14, 2011

(65) Prior Publication Data

US 2012/0134117 A1 May 31, 2012

(30) Foreign Application Priority Data

Nov. 30, 2010 (TW) ................................ 99141546 A

(51) Int. Cl.
*H05K 7/14* (2006.01)
*H05K 7/18* (2006.01)

(52) U.S. Cl.
USPC ............................ 361/801; 361/802; 361/803

(58) Field of Classification Search
USPC ................. 361/726, 727, 732, 740, 747, 754, 361/759, 801–803; 292/139, 150, 207, 302
See application file for complete search history.

(56) References Cited

U.S. PATENT DOCUMENTS

| | | | | |
|---|---|---|---|---|
| 5,490,036 A | * | 2/1996 | Lin et al. ................... | 361/679.55 |
| 5,966,284 A | * | 10/1999 | Youn et al. ................ | 361/679.17 |
| 6,317,315 B1 | * | 11/2001 | Lee et al. .................. | 361/679.29 |
| 6,661,650 B2 | * | 12/2003 | Nakajima et al. ......... | 361/679.09 |
| 6,751,089 B2 | * | 6/2004 | Hsieh ........................ | 361/679.09 |
| 6,902,419 B2 | * | 6/2005 | Conway et al. ............. | 439/347 |
| 7,577,000 B2 | * | 8/2009 | Tsorng et al. ............. | 361/802 |

* cited by examiner

*Primary Examiner* — Hung S Bui
(74) *Attorney, Agent, or Firm* — Jianq Chyun IP Office

(57) ABSTRACT

A portable electronic device includes a casing, an electronic module, at least one flexible arm, and at least one latch. The casing has a containing portion, at least one sliding slot, and at least one positioning structure. The electronic module is configured in the containing portion and has at least one locking slot. The flexible arm is connected to the casing and located between the sliding slot and the electronic module. Besides, the flexible arm has a position-limiting protrusion. The latch has a first bump and at least one second bump. When the latch slides into the sliding slot, the first bump interferes with the positioning structure, so that the latch is positioned, and the second bump pushes the position-limiting protrusion into the locking slot, so that the electronic module is restricted within the containing portion.

9 Claims, 10 Drawing Sheets

PORTABLE ELECTRONIC DEVICE

CROSS-REFERENCE TO RELATED APPLICATION

This application claims the priority benefit of Taiwan application serial no. 99141546, filed on Nov. 30, 2010. The entirety of the above-mentioned patent application is hereby incorporated by reference herein and made a part of this specification.

BACKGROUND OF THE INVENTION

1. Field of the Invention

The invention relates to an electronic device. More particularly, the invention relates to a portable electronic device.

2. Description of Related Art

In the information era, people's reliance on electronic devices is increasing day by day. In compliance with the demands of high efficiency and portability, portable electronic devices, e.g., notebook computers, have become indispensable to the modern people's lives and work. A notebook computer includes an electronic module, such as a keyboard module, which allows a user to input instructions to the internal system of the notebook computer for execution.

In most cases, the keyboard module of the notebook computer is embedded into the host and locked to the host via screws. When the keyboard module is to be maintained or cleaned, the screws locked to the keyboard module need to be removed, and so do other elements that are located in the casing of the notebook computer and block the keyboard module. Thereby, the process of dissembling the keyboard module is time-consuming, which causes inconvenience to maintenance and cleaning of the keyboard module.

SUMMARY OF THE INVENTION

The invention is directed to a portable electronic device having an electronic module that can be easily assembled and dissembled.

The invention provides a portable electronic device that includes a casing, an electronic module, at least one flexible arm, and at least one latch. The casing has a containing portion, at least one sliding slot, and at least one positioning structure. The electronic module is configured in the containing portion and has at least one locking slot. The flexible arm is connected to the casing and located between the sliding slot and the electronic module. Besides, the flexible arm has a position-limiting protrusion. The latch has a first bump and at least one second bump. When the latch slides into the sliding slot, the first bump interferes with the positioning structure, such that the latch is positioned, and the second bump pushes the position-limiting protrusion into the locking slot, such that the electronic module is restricted within the containing portion.

According to an embodiment of the invention, the electronic module is a keyboard module.

According to an embodiment of the invention, the flexible arm has a guiding inclined surface. When the latch slides into the sliding slot, the first bump and the second bump sequentially slide along the guiding inclined surface.

According to an embodiment of the invention, the casing includes a base and a cover. The containing portion, the sliding slot, and the positioning structure are located on the base. The cover covers the base and has an opening that exposes the electronic module.

According to an embodiment of the invention, the positioning structure includes two positioning ribs. When the latch slides into the sliding slot, the first bump is locked between the two positioning ribs.

According to an embodiment of the invention, the latch has a protrusion that is suitable for sliding into the sliding slot and partially protruding from the sliding slot.

According to an embodiment of the invention, the portable electronic device further includes a housing that has a battery slot and an opening that is located in the battery slot. The casing is assembled to the housing, and the opening of the housing exposes the sliding slot.

According to an embodiment of the invention, the number of the at least one sliding slot, the number of the at least one positioning structure, the number of the at least one locking slot, the number of the at least one flexible arm, and the number of the at least one latch are plural. When the latches respectively slide into the sliding slots, the structural interference respectively occurs between the first bumps and the positioning structures, such that the latches are respectively positioned, and the second bumps respectively push the position-limiting protrusions into the locking slots, such that the electronic module is restricted within the containing portion.

According to an embodiment of the invention, the number of the at least one second bump, the number of the at least one locking slot, and the number of the at least one flexible arm are plural. When the latch slides into the sliding slot, the structural interference occurs between the first bump and the positioning structure, such that the latch is positioned, and the second bumps respectively push the position-limiting protrusions into the locking slots, such that the electronic module is restricted within the containing portion.

Based on the above, the electronic module is placed in the containing portion of the casing in this invention. The latch can slide into the sliding slot of the casing, and the bumps of the latch push the flexible arm that is connected to the casing to the electronic module, such that the position-limiting protrusion of the flexible arm is locked to the locking slot of the electronic module, and that the electronic module is restricted within the containing portion to complete the assembly of the electronic module. When a user intends to dissemble the electronic module, the user merely pushes the latch to stop the bumps from pushing the flexible arm, and thereby the position-limiting protrusion of the flexible arm is removed from the locking slot of the electronic module. As such, the electronic module can be dissembled from the casing. Consequently, the process of assembling and dissembling the electronic module can be simplified, thus facilitating the maintenance and cleaning of the electronic module.

In order to make the aforementioned and other features and advantages of the invention more comprehensible, embodiments accompanying figures are described in detail below.

BRIEF DESCRIPTION OF THE DRAWINGS

The accompanying drawings constituting a part of this specification are incorporated herein to provide a further understanding of the invention. Here, the drawings illustrate embodiments of the invention and, together with the description, serve to explain the principles of the invention.

DESCRIPTION OF EMBODIMENTS

Figure 1:
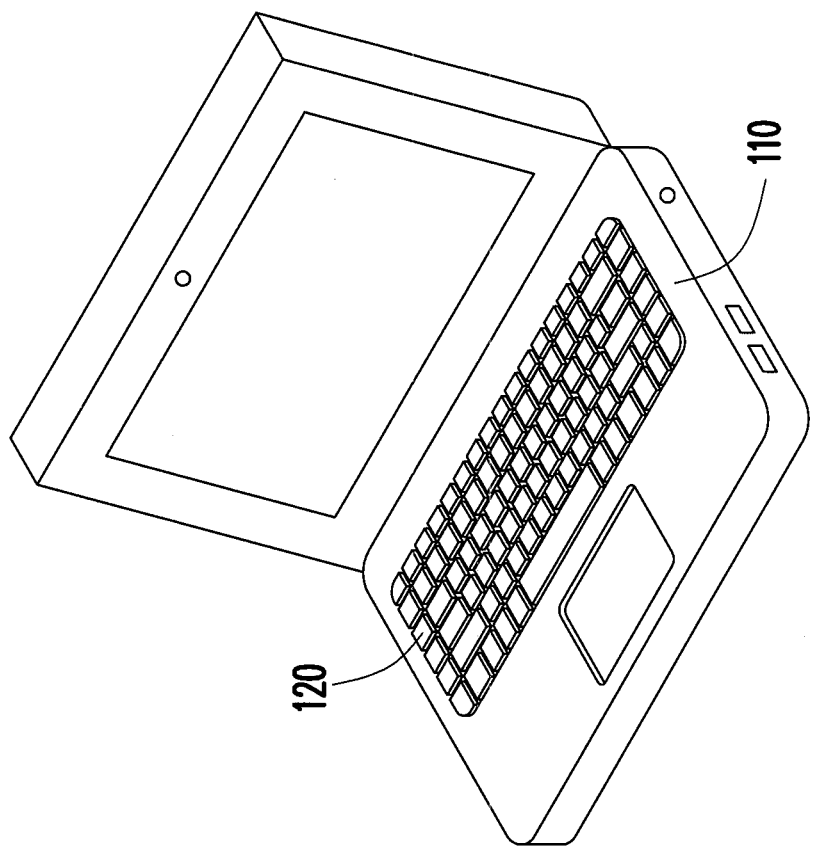
FIG. 1 is a three-dimensional view illustrating a portable electronic device according to an embodiment of the invention.
Figure 2:
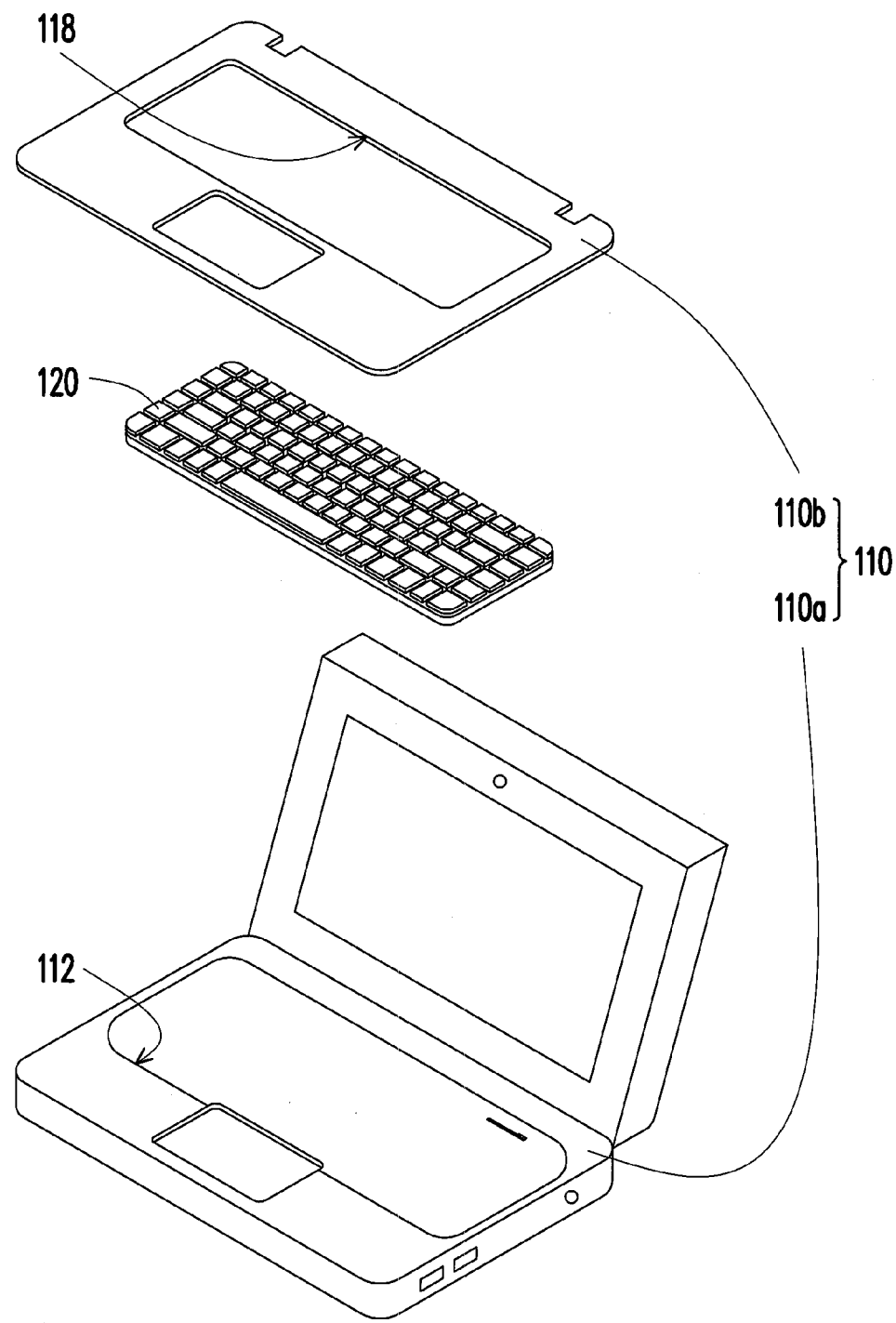
FIG. 2 is an explosive view partially illustrating the portable electronic device depicted in FIG. 1.
Figure 3:
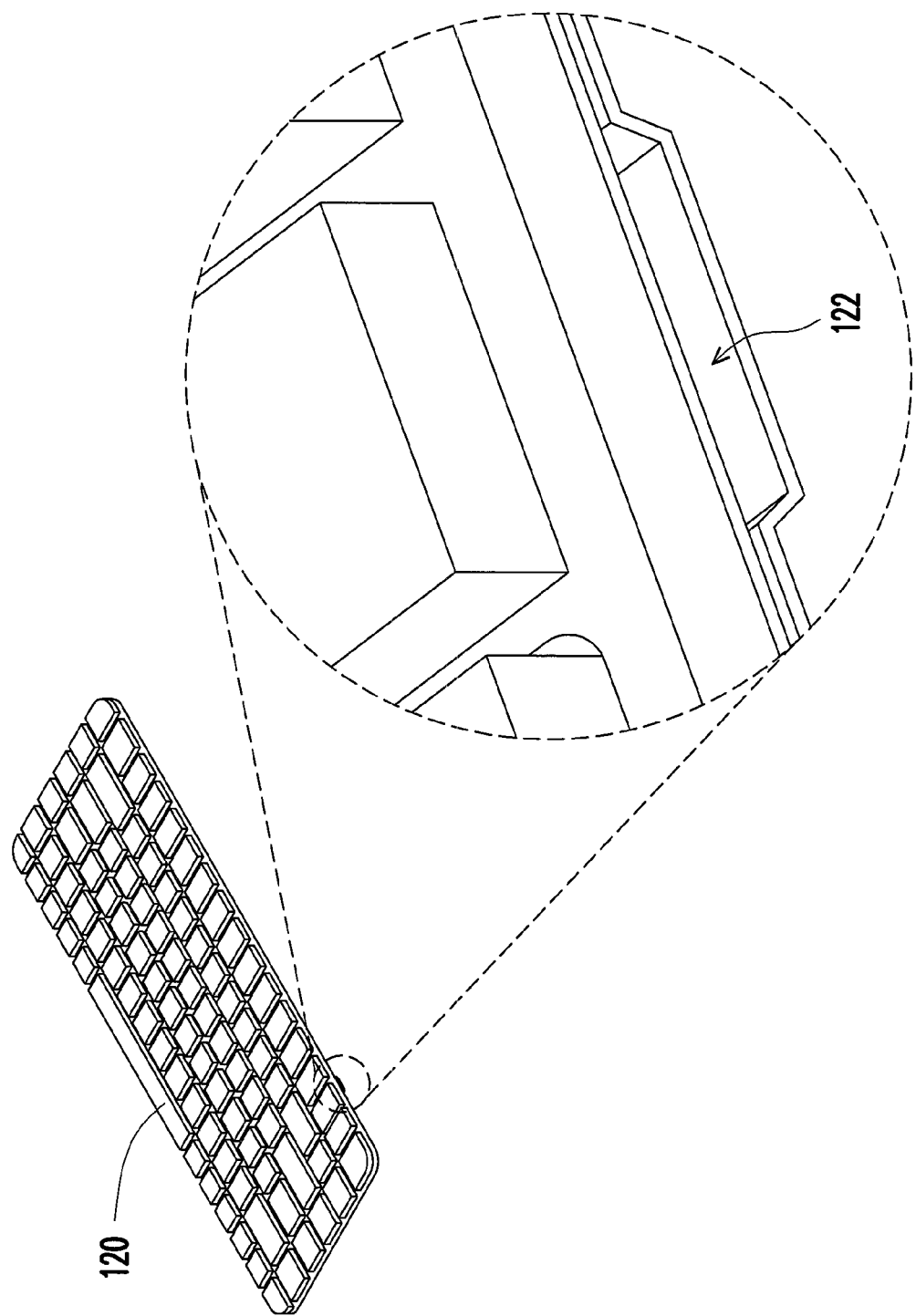
FIG. 3 is a three-dimensional view illustrating the electronic module depicted in FIG. 1.
Figure 4:
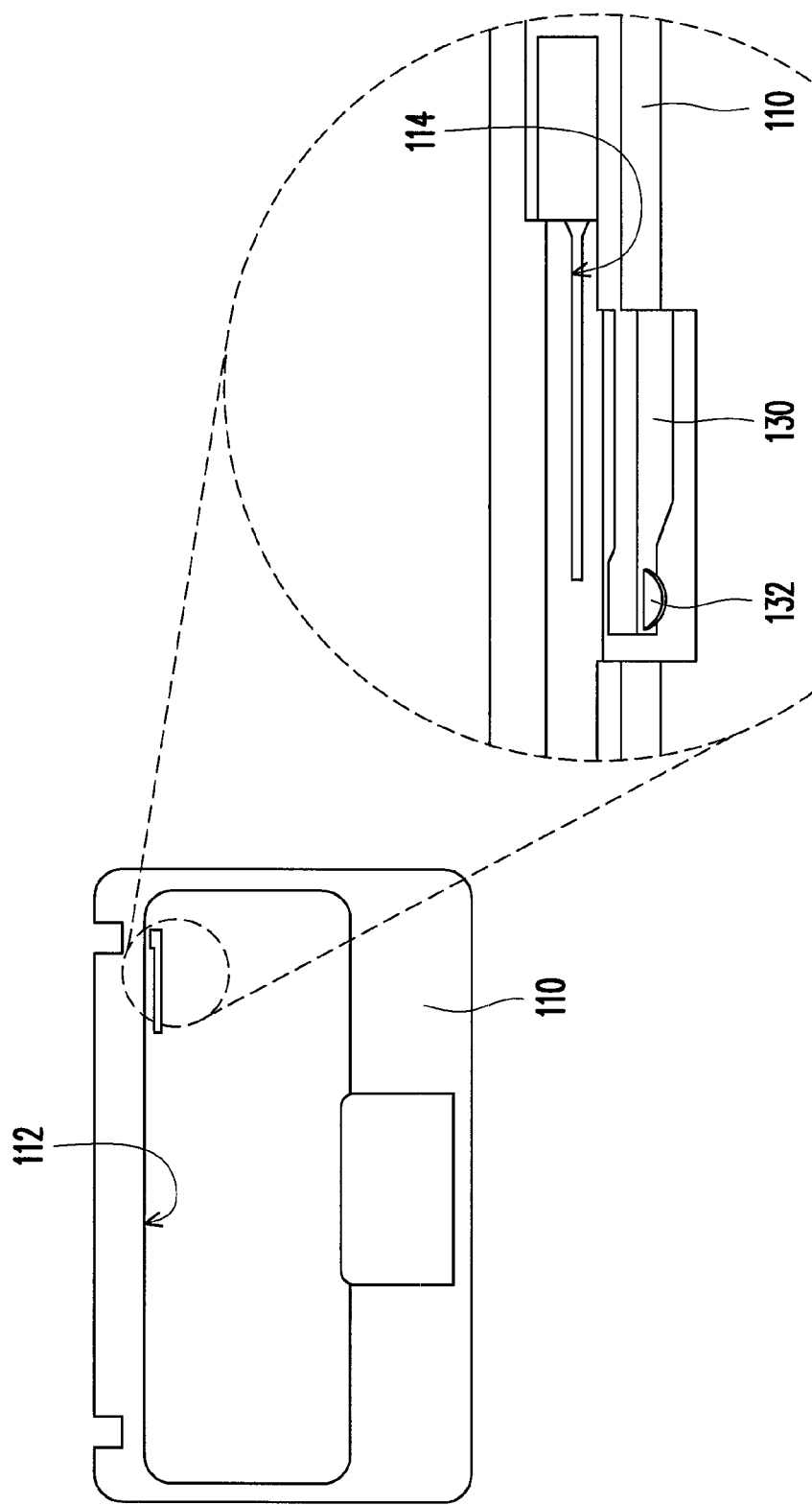
FIG. 4 is a top view illustrating a base depicted in FIG. 1.

FIG. 1 is a three-dimensional view illustrating a portable electronic device according to an embodiment of the invention. FIG. 2 is an explosive view partially illustrating the portable electronic device depicted in FIG. 1. FIG. 3 is a three-dimensional view illustrating the electronic module depicted in FIG. 1. FIG. 4 is a top view illustrating a base depicted in FIG. 1. With reference to FIG. 1 to FIG. 4, the portable electronic device 100 of this embodiment includes a casing 110, an electronic module 120, at least one flexible arm 130, and at least one latch 140. Only one flexible arm 130 and one latch 140 are shown in the drawings. The casing 110 has a containing portion 112 and at least one sliding slot 114. In the drawings, only one sliding slot 114 is depicted. The electronic module 120 is configured within the containing portion 112 and has at least one locking slot 122. In the drawings, only one locking slot 122 is depicted.

As indicated in FIG. 2, the casing 110 of this embodiment includes a base 110a and a cover 110b. The containing portion 112 and the sliding slot 114 are formed on the base 110a. The cover 110b covers the base 110a and has an opening 118 that exposes the electronic module 120. The electronic module 120 of this embodiment is a keyboard module assembled to a notebook computer, for instance, which is not limited in this invention. According to other embodiments of the invention, the electronic module 120 can be a touch pad module, a battery module, or components suitable for being assembled to other types of electronic devices.

Figure 5:
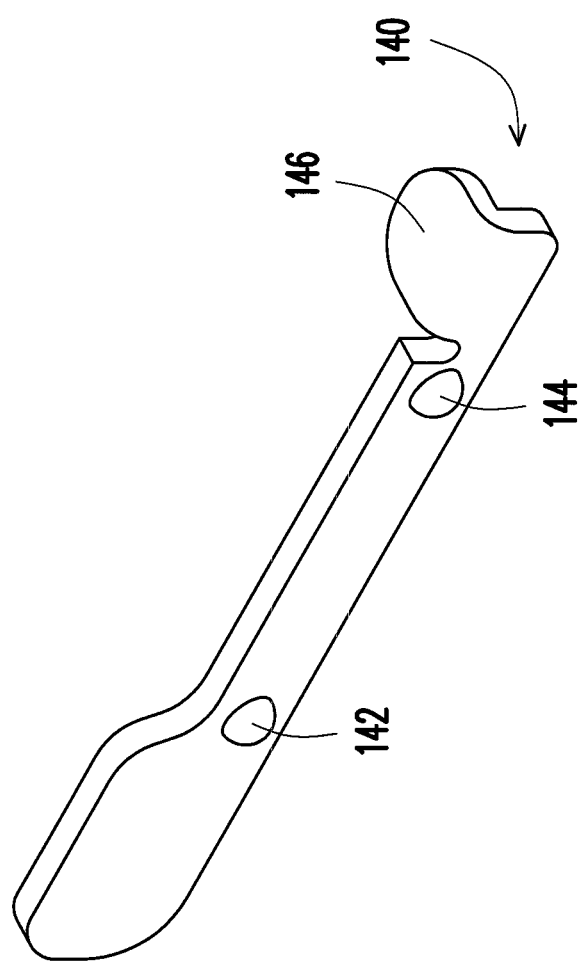
FIG. 5 is a three-dimensional view illustrating a latch 140 depicted in FIG. 2.
Figure 6:
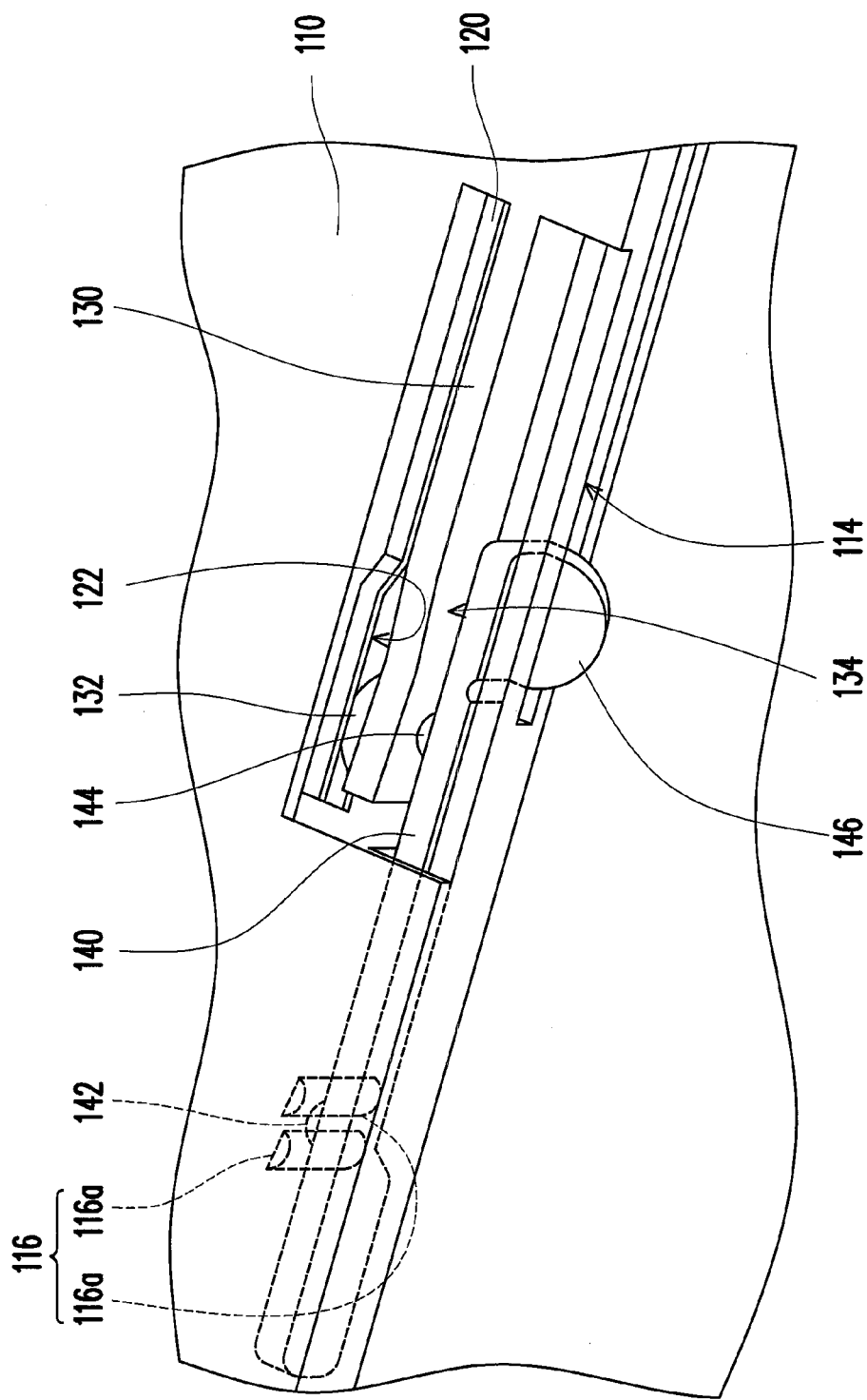
FIG. 6 is a three-dimensional view partially illustrating the portable electronic device depicted in FIG. 1.

FIG. 5 is a three-dimensional view illustrating a latch 140 depicted in FIG. 2. FIG. 6 is a three-dimensional view partially illustrating the portable electronic device depicted in FIG. 1. To better illustrate the invention, a partial area of the back side of the casing 110 (shown in FIG. 4) is depicted in FIG. 6. With reference to FIG. 5 and FIG. 6, the flexible arm 130 connected to the casing 110 is located between the sliding slot 114 and the electronic module 120, and the flexible arm 130 has a position-limiting protrusion 132. The latch 140 has a first bump 142 and at least one second bump 144, and only one second bump 144 is shown in the drawings. The casing 110 has at least one positioning structure 116, and only one positioning structure 116 is shown in the drawings. Here, the positioning structure 116, for example, is formed on the base 110a shown in FIG. 2. When the latch 140 slides into the sliding slot 114, as indicated in FIG. 6, the first bump 142 interferes with the positioning structure 116, such that the latch 140 is positioned, and the second bump 144 pushes the position-limiting protrusion 132 into the locking slot 122, such that the electronic module 120 is restricted within the containing portion 112 (shown in FIG. 1).

Under said configuration, when the electronic module 120 is placed in the containing portion 112 of the casing 110, the latch 140 can slide into the sliding slot 114 of the casing 110, and the second bump 144 of the latch 140 pushes the flexible arm 130 that is connected to the casing 110 to the electronic module 120, such that the position-limiting protrusion 132 of the flexible arm 130 is locked to the locking slot 122 of the electronic module 120, and that the electronic module 120 is restricted within the containing portion 112 to complete the assembly of the electronic module 120. When a user intends to dissemble the electronic module 120, the user merely pushes the latch 140 to stop the second bump 144 from pushing the flexible arm 130, and thereby the position-limiting protrusion 132 of the flexible arm 130 is removed from the locking slot 122 of the electronic module 120. As such, the electronic module 120 can be dissembled from the casing 110. Consequently, the process of assembling and dissembling the electronic module 120 can be simplified, thus facilitating the maintenance and cleaning of the electronic module 120. The process of assembling and dissembling the electronic module 120 is further elaborated hereinafter with reference to the drawings.

Figure 7A:
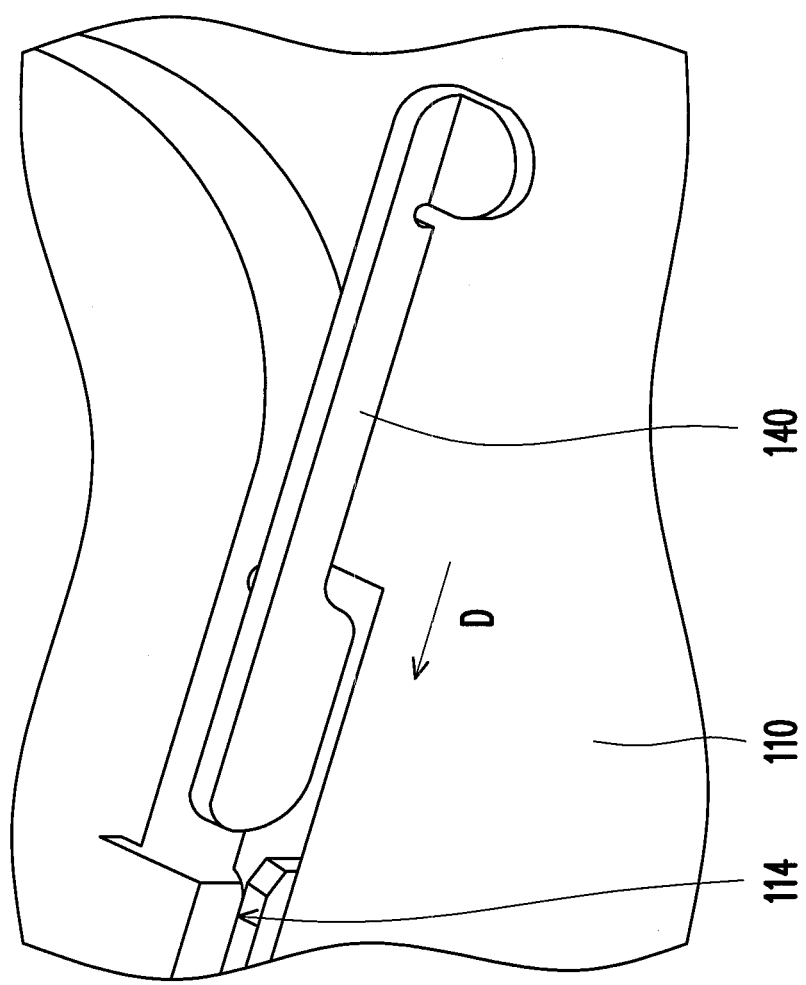
FIG. 7A to FIG. 7C illustrate a process of assembling the portable electronic device depicted in FIG. 1.
Figure 7B:
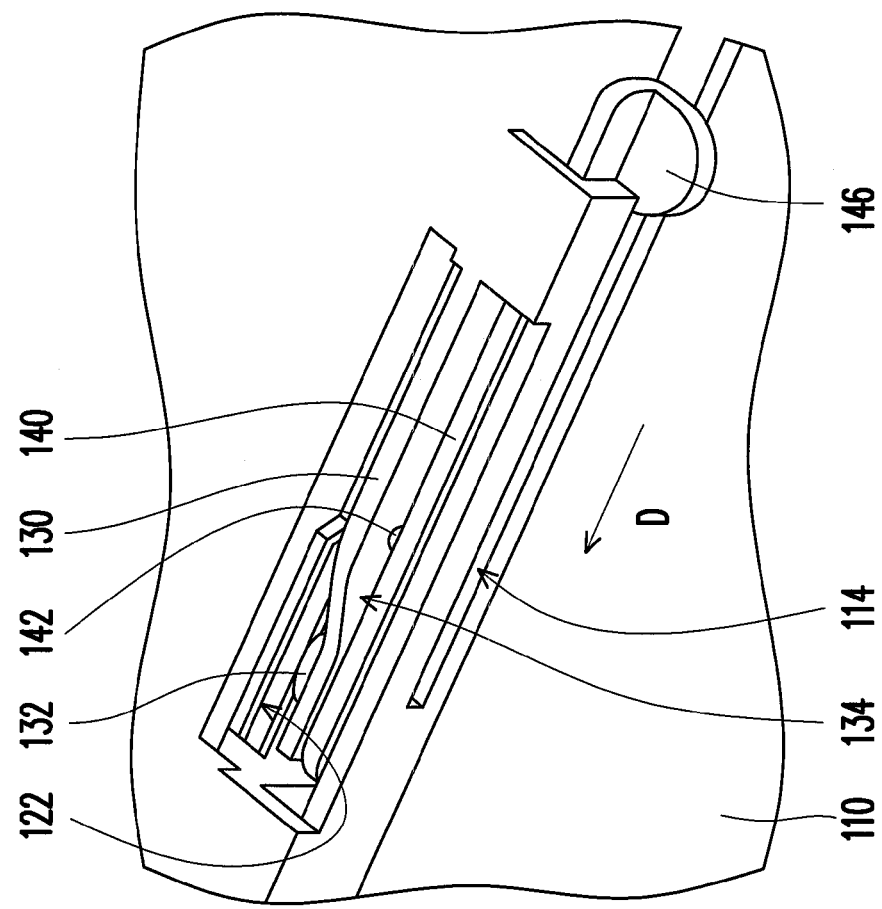
Figure 7C:
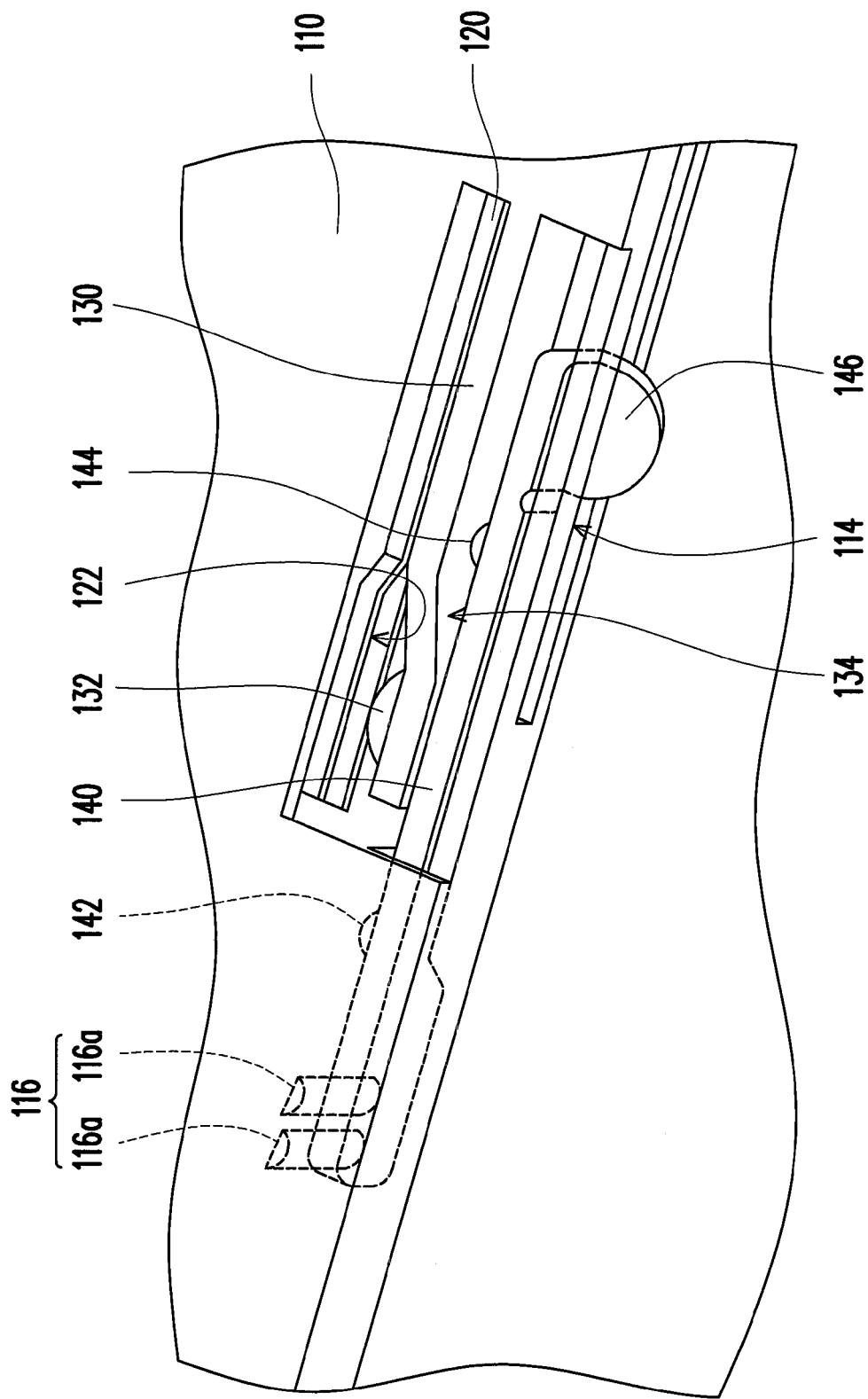

FIG. 7A to FIG. 7C illustrate a process of assembling the portable electronic device depicted in FIG. 1. To better illustrate the invention, a partial area of the back side of the casing 110 (shown in FIG. 4) is depicted in FIG. 7A to FIG. 7C. After the electronic module 120 is placed into the containing portion 112 depicted in FIG. 1, the user can horizontally move the latch 140 along a direction D from the position shown in FIG. 7A to the position shown in FIG. 7B, and the latch 140 then slides into the sliding slot 114 along the direction D, such that the first bump 142 passes the flexible arm 130 and arrives at the position shown in FIG. 7C. At this time, the latch 140 does not come off from the sliding slot 114 because the first bump 142 is restricted by the flexible arm 130. When the user keeps on pushing the latch 140 along the direction D, the first bump 142 arrives at the position shown in FIG. 6, and the first bump 142 interferes with the positioning structure 116 to position the latch 140. The second bump 144 pushes the flexible arm 130 to the electronic module 120, such that the position-limiting protrusion 132 is locked to the locking slot 122. As a result, the position of the electronic module 120 is restricted, and the assembly of the portable electronic device is completed. When the user intends to dissemble the electronic module 120, the user can push the latch 140, such that the second bump 144 moves from the position shown in FIG. 6 to the position shown in FIG. 7C, and that the position-limiting protrusion 132 is removed from the locking slot 122. Thereby, the electronic module 120 can be dissembled from the casing 110.

To be more specific, the flexible arm 130 of this embodiment has a guiding inclined surface 134. When the latch 140 slides along the sliding slot 114 from the position shown in FIG. 7B to the position shown in FIG. 7C, the first bump 142 slides along the guiding inclined surface 134 and passes the flexible arm 130. When the latch 140 slides along the sliding slot 114 from the position shown in FIG. 7C to the position shown in FIG. 6, the second bump 144 slides along the guiding inclined surface 134 and arrives at the position corresponding to the position-limiting protrusion 132. The positioning structure 116 of this embodiment includes two positioning ribs 116a. When the latch 140 slides into the sliding slot 114 and is located at the position shown in FIG. 6, the first bump 142 is locked between the two positioning ribs 116a and is positioned. In addition, the latch 140 of this embodiment has a protrusion 146 suitable for sliding into the sliding slot 114 and partially protruding from the sliding slot 114. Thereby, the user is allowed to pull the protrusion 146, such that the latch 140 can move along the sliding slot 114.

Figure 8:
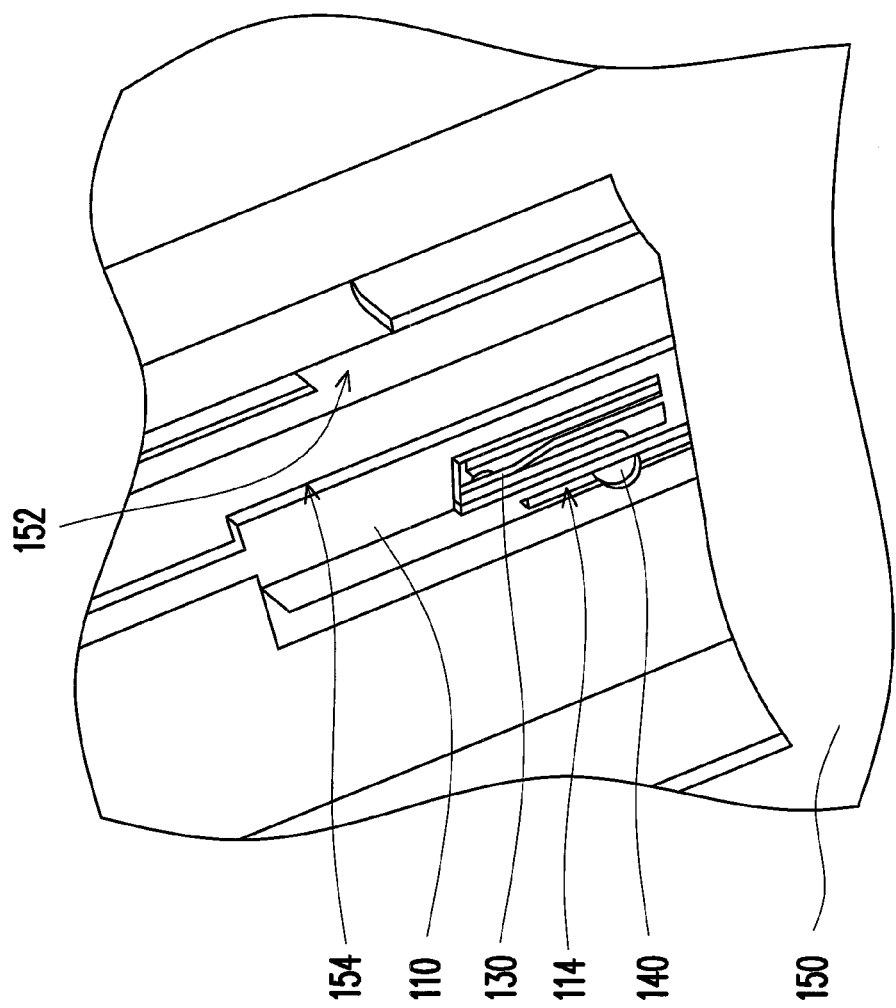
FIG. 8 is a three-dimensional view partially illustrating the portable electronic device depicted in FIG. 1.

FIG. 8 is a three-dimensional view partially illustrating the portable electronic device depicted in FIG. 1. With reference to FIG. 5 and FIG. 8, the portable electronic device 100 of this embodiment can further include a housing 150 that has a battery slot 152 and an opening 154 located in the battery slot 152. The casing 110 is assembled to the housing 150, and the opening 154 of the housing 150 exposes the sliding slot 114. The user can pull the protrusion 146 through the opening 154 located in the battery slot 152, so as to assemble or dissemble the electronic module 120.

In the previous embodiments, the number of the sliding slot 114 and the positioning structure 116 of the casing 110, the number of the locking slot 122 of the electronic module 120, the number of the flexible arm 130, the number of the latch 140, and the number of the second bump 144 of the latch 140 are singular. However, the invention is not limited thereto. According to another embodiment of the invention, the casing 110 can have a plurality of sliding slots 114 and a plurality of positioning structures 116, the electronic module 120 can have a plurality of locking slots 122, and the number of the flexible arm 130, the number of the latch 140, and the number of the second bump 144 of the latch 140 can all be plural. Under said configuration, the latches 140 can respectively slide into the sliding slots 114, such that the structural interference occurs between the first bump 142 of each of the latches 140 and the corresponding positioning structure 116 to position each of the latches 140, and the second bump 144 of each of the latches 140 pushes the position-limiting protrusion 132 of the corresponding flexible arm 130 into the corresponding locking slot 122, respectively, such that the electronic module 120 is restricted within the containing portion 112.

In addition, according to still another embodiment of the invention, the number of the latch 140, the number of the sliding slot 114, and the number of the positioning structure 116 can all be singular. The latch 140 has a plurality of second bumps 144, and the number of the flexible arm 130 and the number of the locking slot 122 of the electronic module 120 are plural. The latch 140 can slide into the sliding slot 114, such that the structural interference occurs between the first bump 142 and the positioning structure 116 to position the latch 140, and each of the second bumps 144 pushes the position-limiting protrusion 132 of the corresponding flexible arm 130 into the corresponding locking slot 122, such that the electronic module 120 is restricted within the containing portion 112.

In light of the foregoing, the electronic module is placed in the containing portion of the casing in this invention. The latch can slide into the sliding slot of the casing, and the bumps of the latch push the flexible arm that is connected to the casing to the electronic module, such that the position-limiting protrusion of the flexible arm is locked to the locking slot of the electronic module, and that the electronic module is restricted within the containing portion to complete the assembly of the electronic module. When a user intends to dissemble the electronic module, the user merely pushes the latch to stop the bumps from pushing the flexible arm, and thereby the position-limiting protrusion of the flexible arm is removed from the locking slot of the electronic module. As such, the electronic module can be dissembled from the casing. Consequently, the process of assembling and dissembling the electronic module can be simplified, thus facilitating the maintenance of the electronic module.

Although the invention has been described with reference to the above embodiments, it will be apparent to one of the ordinary skill in the art that modifications to the described embodiment may be made without departing from the spirit of the invention. Accordingly, the scope of the invention will be defined by the attached claims not by the above detailed descriptions.

What is claimed is:

1. A portable electronic device comprising:
   a casing having a containing portion, at least one sliding slot, and at least one positioning structure;
   an electronic module configured in the containing portion and having at least one locking slot;
   at least one flexible arm connected to the casing and located between the sliding slot and the electronic module, the flexible arm having a position-limiting protrusion; and
   at least one latch having a first bump and at least one second bump, wherein when the latch slides into the sliding slot, the first bump interferes with the positioning structure, such that the latch is positioned, and the second bump pushes the position-limiting protrusion into the locking slot, such that the electronic module is restricted within the containing portion.

2. The portable electronic device as claimed in claim 1, wherein the electronic module is a keyboard module.

3. The portable electronic device as claimed in claim 1, wherein the flexible arm has a guiding inclined surface, and the first bump and the second bump sequentially slide along the guiding inclined surface when the latch slides into the sliding slot.

4. The portable electronic device as claimed in claim 1, wherein the casing comprises:
   a base, the containing portion, the sliding slot, and the positioning structure being located on the base; and
   a cover covering the base and having an opening, the opening exposing the electronic module.

5. The portable electronic device as claimed in claim 1, wherein the positioning structure comprises two positioning ribs, and the first bump is locked between the two positioning ribs when the latch slides into the sliding slot.

6. The portable electronic device as claimed in claim 1, wherein the latch has a protrusion suitable for sliding into the sliding slot and partially protruding from the at least one sliding slot.

7. The portable electronic device as claimed in claim 1, further comprising a housing having a battery slot and an opening located in the battery slot, the housing being assembled to the casing, the opening of the housing exposing the sliding slot.

8. The portable electronic device as claimed in claim 1, wherein the number of the sliding slot, the number of the positioning structure, the number of the locking slot, the number of the flexible arm, and the number of the latch are plural, when the latches respectively slide into the sliding slots, the structural interference respectively occurs between the first bumps and the positioning structures, such that the latches are respectively positioned, and the second bumps respectively push the position-limiting protrusions into the locking slots, such that the electronic module is restricted within the containing portion.

9. The portable electronic device as claimed in claim 1, wherein the number of the second bump, the number of the locking slot, and the number of the flexible arm are plural, when the latch slide into the sliding slot, the structural interference occurs between the first bump and the at least one positioning structure, such that the latch is positioned, and the second bumps respectively push the position-limiting protrusions into the locking slots, such that the electronic module is restricted within the containing portion.

* * * * *